UNITED STATES PATENT OFFICE.

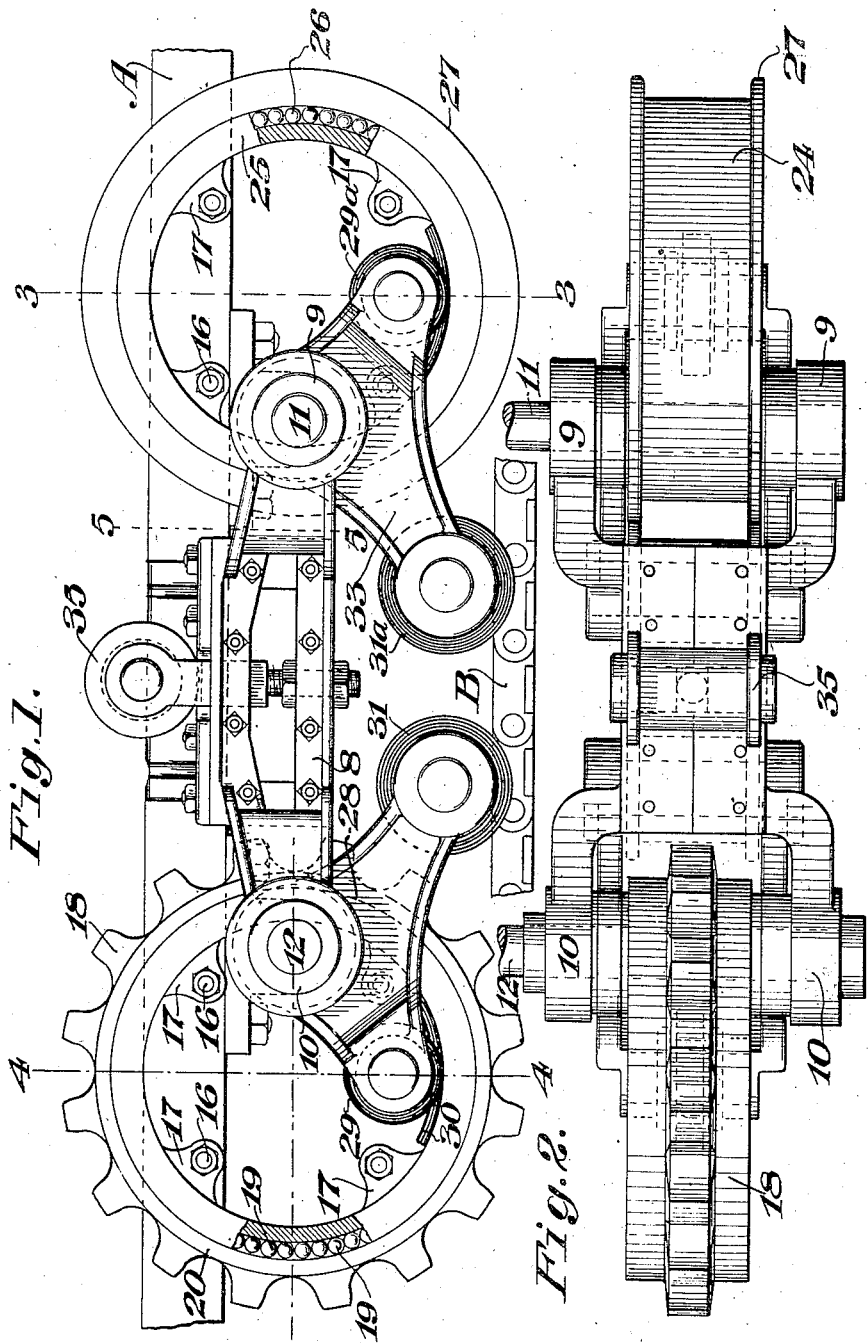

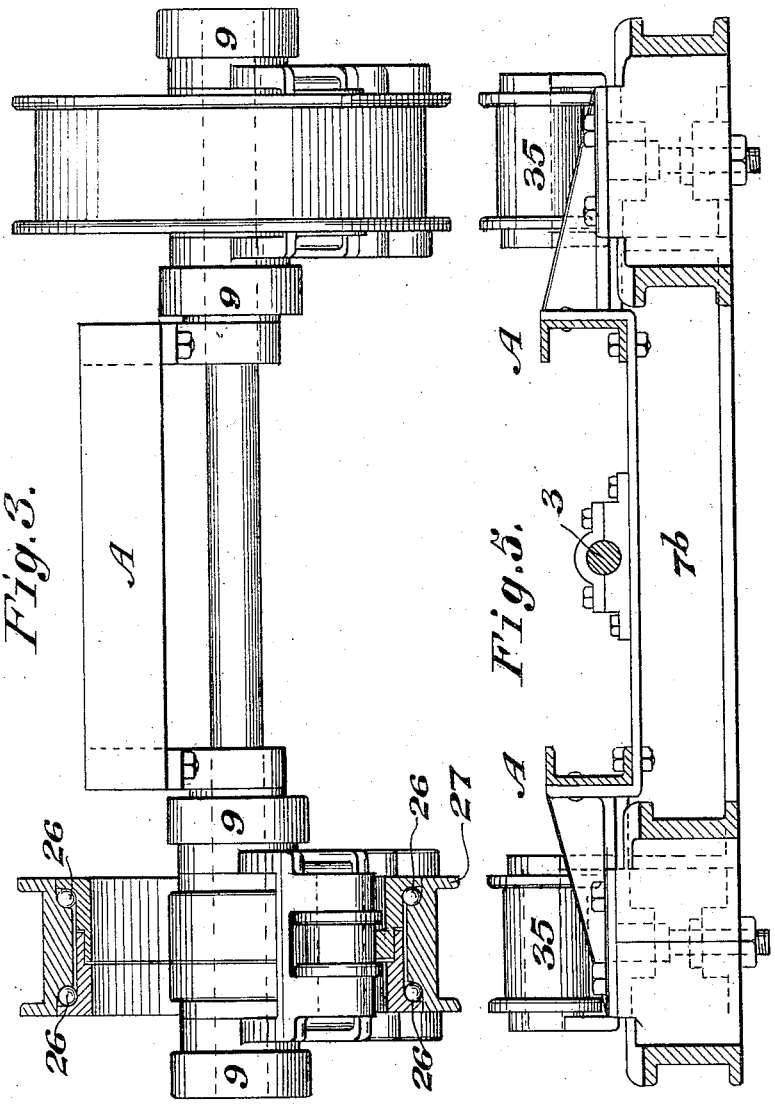

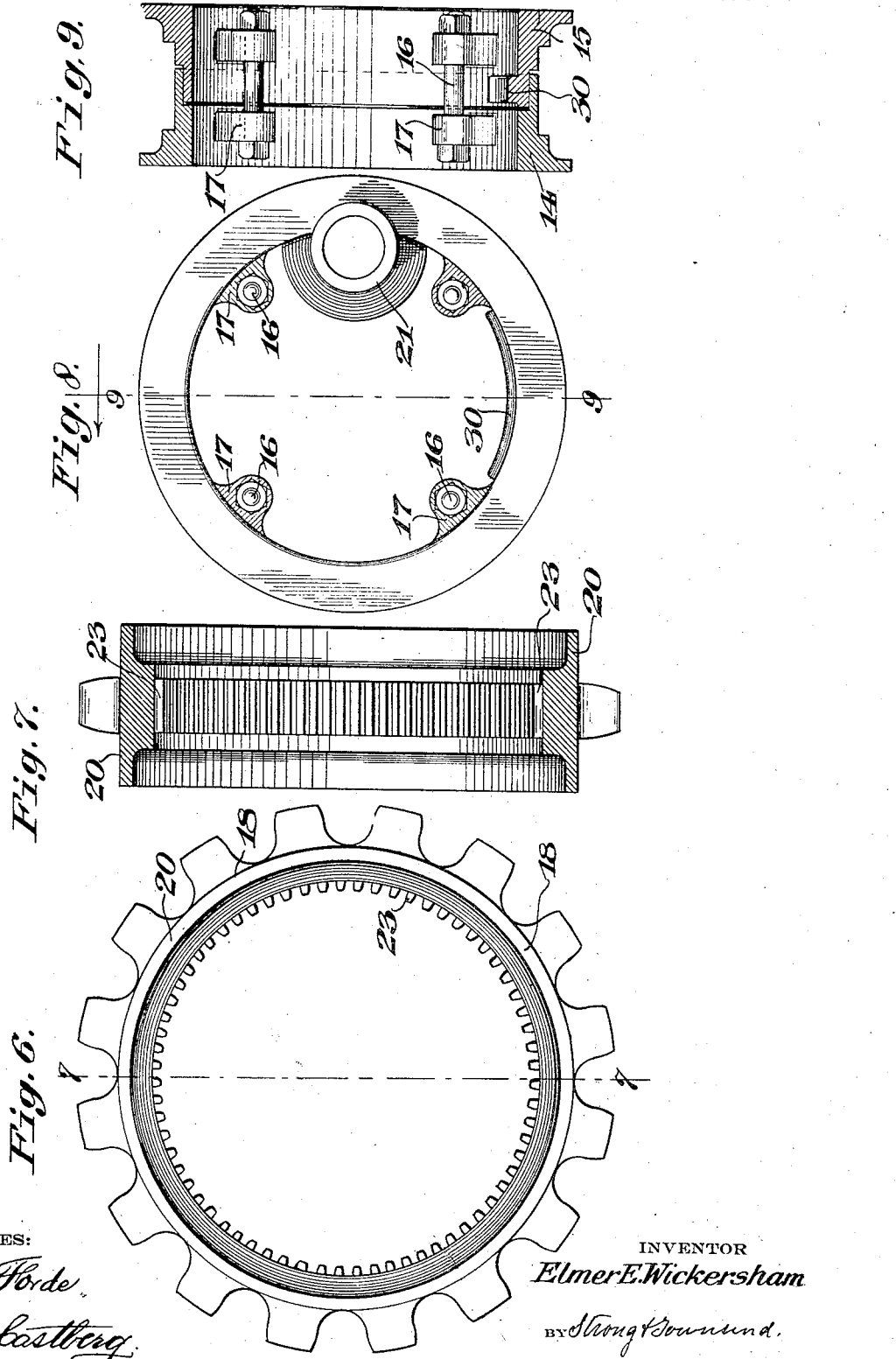

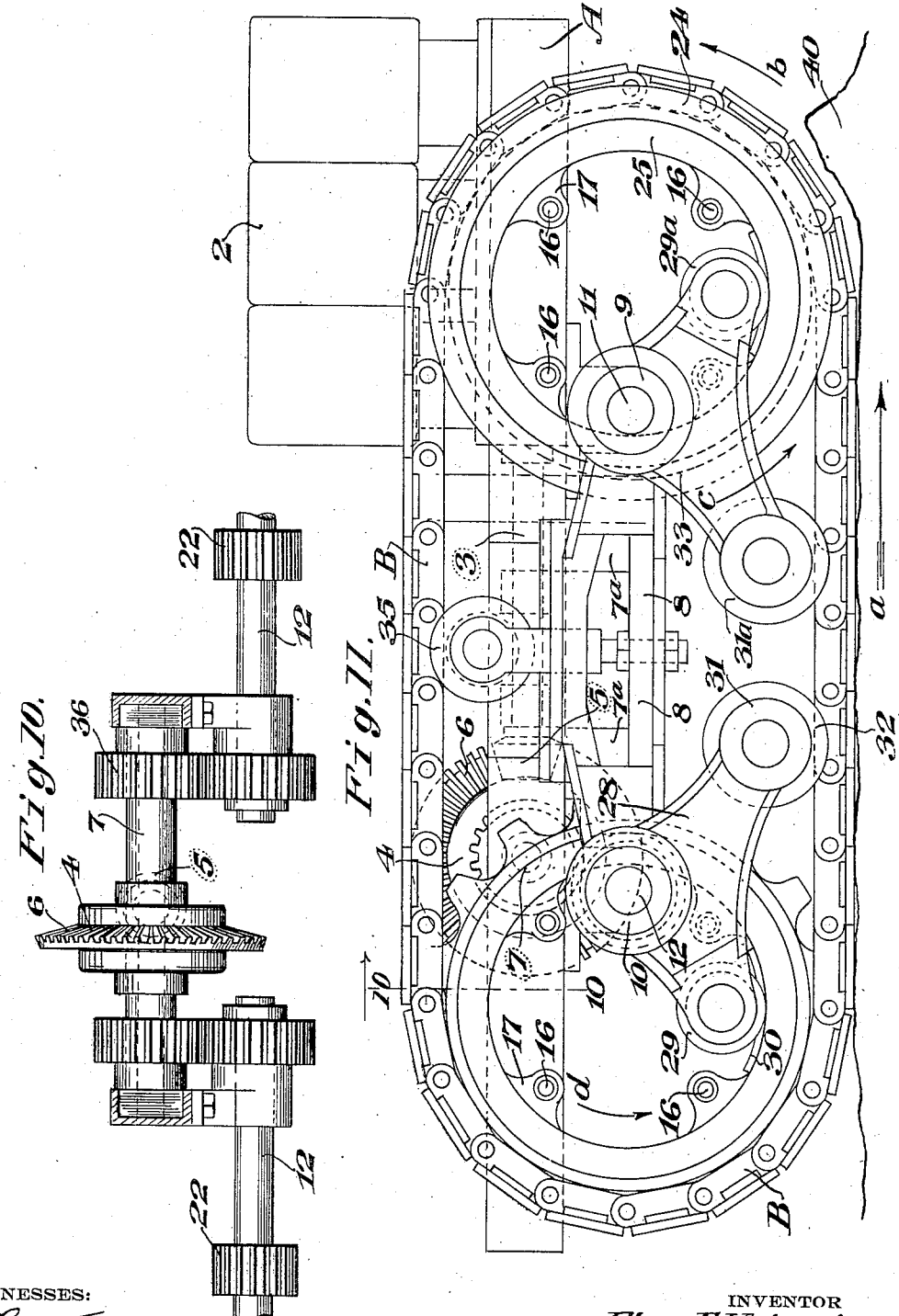

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

CHAIN-TRACK DRIVE AND SUPPORT.

1,258,288.  Specification of Letters Patent.  Patented Mar. 5, 1918.

Application filed October 13, 1915. Serial No. 55,616.

*To all whom it may concern:*

Be it known that I, ELMER E. WICKERSHAM, citizen of the United States, residing at Stockton, in the county of San Joaquin and State of California, have invented new and useful Improvements in Chain-Track Drives and Supports, of which the following is a specification.

This invention relates to tractors of the self-laying track type; and has for its object to simplify and improve the construction and operation of the track driving and supporting means.

This object is accomplished by the provision of a simple, substantial, efficient driving mechanism for transmitting power to the driving sprocket and chain track on tractors of the self laying track type, anti-friction bearings for the driving and driven parts, a new and improved support for the chain track which is capable of yielding at any point along the bearing surface, thus eliminating transmission of undue vibration, or raising of the main frame and engine from a normal horizontal position when chuck holes or rises are encountered.

One form which my invention may assume is exemplified in the following description and illustrated in the accompanying drawing, in which:—

Figure 1 is a side elevation, partly broken away, showing the track drive and support.

Fig. 2 is a plan view of same.

Fig. 3 is a front view on line 3—3, Fig. 1, partly in section, of the idler wheels and supporting shaft.

Fig. 4 is a cross section on line 4—4, Fig. 1.

Fig. 5 is a cross section on line 5—5, Fig. 1.

Fig. 6 is a side elevation of the driving sprocket.

Fig. 7 is a cross section on line 7—7 of Fig. 6.

Fig. 8 is a side elevation of one of the bearing rings.

Fig. 9 is a cross section on line 9—9 of Fig. 8.

Fig. 10 is a rear view taken on line 10—10 of Fig. 11, showing the jack shaft and the connected intermediate drive shaft.

Fig. 11 shows a side elevation of a tractor embodying my invention.

Referring to the drawings in detail, A indicates the main frame of the tractor, 2 the engine, 3 the engine shaft, 4 a differential driven by the engine shaft through the bevel gears 5 and 6, and 7 the jack shaft carrying the differential, and also provided for the purpose of transmitting power to drive the chain track B as will hereinafter be described. Secured crosswise on the main frame are girders 7$^b$, and rigidly secured to the girders exterior of and disposed parallel to the main frame A are a pair of cantaliver frames or yokes 8, one on each side. The outer ends of the cantaliver frames are yoke shaped to form forked bearings 9 and 10; bearings 9 being provided for the purpose of supporting a stationary shaft 11, while bearings 10 form journals for a divided intermediate drive shaft 12.

One of the important features of the present invention is the mounting of the sprockets and idler wheels, which support and drive the chain tracks. By referring to Figs. 1, 2, 4, 6, 7, 8, and 9, the mounting of the driving sprockets will first be described. 14 and 15 indicate two sections of a bearing ring, which sections are secured together by means of bolts 16 passing through lugs 17. The sectional bearing ring is adapted to support the sprocket wheel indicated at 18 and anti-friction members such as the ball races indicated at 19 are interposed between the bearing ring and flanges 20 formed upon the sprocket wheel. The sprocket wheel is ring shaped, and is supported entirely by the ball races and the bearing ring proper. Each bearing ring is in this instance provided with an outwardly projecting hub member 21, which form supports for same, and these hub members are sufficiently long to pass through the forked bearings 10 formed in the rear end of the cantaliver frame yoke 8. The shaft 12 passes through the hub members 21 and also through the bearings 10. In other words, the hub like extensions form sleeves in which the intermediate shaft is journaled. Secured upon the shaft between the sections 14 and 15 of the bearing ring is a driving pinion 22, which intermeshes with an internal gear 23 secured or formed integral with the sprocket wheel 18. The revolving movement of the intermediate shaft is in this manner transmitted through the pinion 22 and the internal gear 23, and revolves the sprocket wheel 18, in this manner permitting the track to be driven or operated directly over or by sprocket 18.

Referring to Figs. 8 and 11 it will be seen that the hub like extensions 21 are positioned off center, in this manner producing an eccentrically disposed support for the bearing ring, which in turn carries the sprocket wheel 18. The eccentric mounting of the bearing ring and sprocket wheel is of great importance, as will hereinafter be described. The mounting of the idler wheel 24, carrying the forward end of the chain, is similar to that described in connection with the sprocket wheel 18. The bearing ring 25 is similarly constructed and is also eccentrically mounted, being carried by the shaft 11. The wheel 24 shown in Figs. 1, 2, 3 and 11, is also carried by ball races 26 to reduce friction to a minimum, and the face of the wheel is flanged as at 27 to prevent the chain track from jumping off.

Pivotally mounted in the forked bearing 10 formed on the rear end of the cantaliver frame 8 is a bell crank 28. One arm of the bell crank is provided with a roller 29, which engages or rests upon a flange 30 formed on the bearing ring. The opposite end of the bell crank is similarly provided with a flanged roller 31, and this is so positioned as to engage with the inner face of the chain track as indicated at 32. Pivotally mounted in the fork shaped bearing 9 formed in the forward end of the cantaliver frame is a bell crank 33. This crank is also provided with rollers 29$^a$ and 31$^a$, which are positioned in the manner of those previously described. Vertically adjustable and positioned approximately in the center of the cantaliver frame is a flanged idler wheel 35, which is provided for the purpose of taking up any slack in the chain and which also serves as a support for the upper side of the track.

The operation of the device will be as follows:—power is transmitted directly from the engine through the shaft 7 and through spur gears 36 (Fig. 10) to the divided intermediate driving shaft 12. The power is then transmitted through the pinions 22 to the internal gears 23 and the connected driving sprockets 18 which propel the chain tracks in the direction desired. The eccentric mounting of the sprocket and idler wheels, supporting and driving the chain track, together with the bell cranks 28 and 33, permits the bearing surface of the track to yield at all points. For instance, referring to Fig. 11, if an obstruction such as indicated at 40 is encountered with the tractor traveling in the direction of arrow $a$ it will be seen that the idler wheel will swing about the shaft 11, or the eccentric mounting point of the bearing ring in the direction of arrow $b$. The bell crank will at the same time rock in the direction of the arrow $c$, causing the wheel 29$^a$ to rise with the bearing ring, while the wheel 31$^a$ will become depressed. In other words, it is possible for the idler wheel to rise and fall without imparting any movement to the main frame A of the tractor. Similarly, as the tractor advances or moves forward and as the obstruction 40 is passed over by different sections of the chain each point will yield. For instance, the moment the tractor is advanced to a point where the obstruction is in alinement with wheel 31 it will cause this to rise about the pivotal mounting or shaft 12, while the sprocket wheel and bearing ring upon which it is mounted will move downward in the direction of arrow $d$, as the upward movement of wheel 31 will cause depression of wheel 29. It can thus be seen that both the sprockets and the idler wheels may rise or fall when obstructions or chuck holes are encountered, without imparting any movement to the main frame of the tractor. The provision of the girders 7$^b$, together with the cantaliver frames, and the manner of securing the same produce a rigid, substantial construction upon which the several wheels and bell crank arms may be mounted, and supported exterior of the main frame A. The provision of the anti-friction members between the bearing rings and the sprocket and idler wheels reduces friction to a minimum, and consequently increases the efficiency and general tractive power of the track. The yieldable mounting of the several members comprising the track support permits the track to yield at all points, thus retaining all parts of same in engagement with the surface over which the tractor is passing, thereby increasing the tractive efficiency without undue vibration or movement of the main frame.

The bearing members 18 and 24, around which the endless, flexible, self-laying track B passes are in the nature of floating sprocket members having the respective eccentric axes of oscillation 12 and 11; the weight of the vehicle frame being supported jointly on these sprocket members and on the self-laying tracks through the medium of the roller bearing bell-cranks 28 and 33.

The device as a whole is simple and substantial, and as the several members, with interposed anti-friction members, are entirely inclosed it is possible to exclude all dust and grit, and they are at the same time easy to maintain and lubricate. The life and efficiency of the device should, therefore, be great and repair work reduced to a minimum. The materials and finish of the several parts may otherwise be such as the judgment and experience of the manufacturer may dictate.

While I have shown and described but one form of my invention herein, it is obvious that the same is susceptible to modification and that many changes in the construction and arrangement of the several parts may be employed without departing from the spirit of the invention as disclosed in the appended claims.

Having thus described my invention, what I claim and desire to secure by Letters Patent is:

1. In a tractor, a driving gear having a central axis of rotation and an eccentric axis of oscillation both located within the periphery thereof, and an endless, flexible, self-laying track traveling around said gear.

2. The combination with a stationary shaft of a bearing ring eccentrically and turnably mounted thereon, and a wheel turnably mounted on the bearing ring.

3. The combination with a stationary shaft of a bearing ring eccentrically and turnably mounted thereon, a wheel turnably mounted on the bearing ring, and anti-friction members interposed between the bearing ring and the wheel.

4. The combination with a bearing of a bearing ring eccentrically and turnably mounted in the bearing, a sprocket wheel turnably mounted on the bearing ring, an internal gear secured interior of the sprocket wheel, a driving shaft extending through the bearing and the bearing ring and a pinion secured on the shaft and intermeshing with the internal gear.

5. A chain track support and driving mechanism for tractors comprising a pair of shafts a bearing ring eccentrically and turnably mounted one on each shaft, a sprocket wheel journaled and turnably mounted on one bearing ring, an idler wheel journaled and turnably mounted on the other bearing ring, an endless chain track surrounding the sprocket and idler wheel, and means for driving the sprocket wheel.

6. A chain track support and driving mechanism for tractors comprising a pair of shafts a bearing ring eccentrically and turnably mounted one on each shaft, a sprocket wheel journaled and turnably mounted on one bearing ring, an idler wheel journaled and turnably mounted on the other bearing ring, an endless chain track surrounding the sprocket and idler wheel, means for driving the sprocket wheel, a pair of bell crank arms pivotally mounted one on each shaft, a roller journaled in one end of each bell-crank, engageable with the adjacent bearing ring, and a roller journaled in the other end of each bell-crank engageable with the chain track.

7. In a tractor, a driving wheel, an idler wheel and an endless, flexible, self-laying track traveling around said wheels, each of said wheels having a central axis of rotation and an eccentric axis of oscillation both located within the periphery of their respective wheel.

8. In a tractor, a pair of driving and supporting wheels each having a central axis of rotation and an eccentric axis of oscillation, an endless, flexible track traveling around said wheels, and a compensating connection between each of said wheels and the track for automatically producing and reducing slack in the track to permit oscillating movement of the wheels.

9. The combination with the endless chain track on a tractor and the driving sprocket and idler wheels supporting same, of eccentrically and pivotally mounted bearing members supporting the sprocket and idler wheels, and means for normally holding the bearing members in a position where their true centers will be in horizontal alinement with the eccentric pivotal points.

10. A driving gear comprising a bearing ring eccentrically and pivotally supported and a driving gear mounted exterior of and concentric with the bearing ring.

11. In combination with a vehicle frame and an endless flexible, self-laying track support, a pair of floating sprocket members around which the endless track travels, each sprocket member having an eccentric axis of oscillation, and means bearing both on the sprocket members and on the track for supporting the vehicle frame.

12. A mounting for vehicles consisting in the combination with the vehicle frame of an endless, self-laying track, front and rear wheels around which the track passes, and bell-crank members fulcruming on the frame and having a roller bearing on the ground of the track and also on the wheel members.

13. A mounting for vehicles, consisting in the combination with the vehicle frame of front and rear wheel members arranged in line and mounted for oscillation on respective eccentric axes which are journaled in the frame, bell-cranks journaling on the axes each having one member bearing on the track and the other member on respective portions of said wheels.

14. A mounting for vehicles of the self-laying track variety, comprising a pair of dual axis sprocket and idler members, an endless, flexible track traveling over said members, and a compensating connection between each of said members and the track for automatically producing and reducing slack in said track to permit the track to conform to the irregularities of the surface over which it is passed.

15. A mounting for vehicles of the self-laying track type, comprising a pair of dual axis sprocket and idler members, an endless, flexible chain traveling about said members, a bearing ring for each of said members, an axle carried eccentrically on each of said bearing rings to receive and support the frame of the vehicle, and a rocking member engaging the lower run of the track and the bearing ring for supporting each of said eccentrically mounted axles.

16. In a tractor, rotatable carrying and driving wheels, an endless, flexible track traveling over said wheels, and separate pivotal connections between each of said wheels and the tractor frame whereby the wheels may rise and fall independently of each other and of the tractor frame.

17. In a tractor, rotatable carrying and driving wheels, an endless, flexible track traveling over said wheels, separate pivotal connections between each of said wheels and the tractor frame whereby the wheels may rise and fall independently, and a compensating connection between each wheel and the track automatically producing and reducing slack in the track to permit relative changes in the distance between the wheels.

18. In a tractor, a sprocket wheel having a central axis of rotation and an eccentric axis of oscillation both located within the periphery thereof, an endless, flexible, self-laying track traveling around said sprocket wheel, and a driving gear for said sprocket wheel carried on the eccentrically arranged axis.

19. In a tractor, a pair of rotatable driving and supporting wheels, an endless, flexible track traveling around said wheels, and a separate compensating connection between each wheel and track for automatically varying the distance between said wheels whereby to permit said track to flex in conformity with the surface over which the same is passing.

In testimony whereof I have hereunto set my hand in the presence of two subscribing witnesses.

ELMER E. WICKERSHAM.

Witnesses:
J. H. WEBSTER,
CARL F. OTTO.